Patented May 31, 1938

2,118,940

UNITED STATES PATENT OFFICE 2,118,940

DESTRUCTIVE HYDROGENATION OF DISTILLABLE CARBONACEOUS MATERIAL

Mathias Pier, Heidelberg, Walter Kroenig, Ludwigshafen-on-the-Rhine, and Ernst Donath, Mannheim, Germany, assignors to Standard-I. G. Company, Linden, N. J., a corporation of Delaware No Drawing. Application January 29, 1936, Serial No. 61,309. In Germany December 28, 1931

2 Claims. (Cl. 196—53)

This invention is a continuation-in-part of the invention of our copending application Serial No. 648,434, filed December 22nd, 1932 which relates to the destructive hydrogenation of distillable carbonaceous materials, such as coals, tars, mineral oils, or their conversion or distillation products in the presence of halogens or halogen compounds and in which is claimed the use as a catalyst of a compound of a halogen with a metalloid other than a halogen which in the free state is solid at 18° C. under atmospheric pressure, in combination with a metal substance.

The present invention is a development of a specific embodiment of the invention claimed in the said copending application and is concerned with the use in the said conversion of organic chlorine compounds together with halides of sulphur. It has been found that this catalyst combination promotes the destructive hydrogenation of carbonaceous materials to a very high extent and gives larger yields of the desired products than give other catalysts comprising halogens or halogen compounds. It is of advantage to employ the said organic chlorine compounds and halides of sulphur together with a metal oxide, metal hydroxide, metal sulphide or metal phosphate or a metal of groups 5 and 6 of the periodic system or compounds of the said metals, in so far as these have already not been hereinbefore referred to. These metals of groups 5 and 6 of the periodic system and their compounds give particularly good results in combination with the said organic chlorine compounds and halides of sulphur.

As examples of the said substances comprising metals may be mentioned the oxides, hydroxides, sulphides or phosphates of lithium, copper, silver, magnesium, zinc, tin, cadmium, aluminium, titanium, vanadium, silicon, molybdenum, tungsten, chromium, uranium, managnese, rhenium, nickel, cobalt or iron. The nitrides or halides of vanadium, molybdenum, tungsten, chromium or uranium may also be employed with advantage in the catalyst combination in accordance with the present invention.

Since most of the organic chlorine compounds are liquid under normal conditions of temperature and pressure, they can be readily and thoroughly mixed with the hydrocarbons to be treated, or solid carbonaceous materials such as coal, can be impregnated therewith so that a very thorough dispersion of the catalytic materials in the substances to be destructively hydrogenated is assured. When using the said fluid catalysts moreover the removal of catalyst residues from the reaction products which is sometimes rather irksome becomes superfluous, since the said catalyst compounds usually vaporize during the hydrogenation. Furthermore in the presence of the said organic chlorine compounds no polymerization or condensation products are formed in the initial materials to which they are added such as is sometimes the case when working with free halogens as for example iodine.

As examples of the said organic chlorine compounds may be mentioned chloroform, the chlorine compounds of benzene, naphthalene, toluene, xylene, phenol, cresol, anthraquinone or nitro-benzene, or methyl chloride, ethyl chloride, methylene chloride or ethylene chloride.

Examples of the halides of sulphur which may be employed according to the present invention together with organic chlorine compounds are sulphur mono-chloride, which is of particular advantage, or sulphur mono-bromide or sulphur tetrachloride. Also compounds of sulphur and chlorine containing still other elements in the molecule, such as phosphorus sulphochloride or chlorosulphonic acid or sulphuryl chloride or iodine sulphate (having the formula $I_2(SO_4)_3$) are useful.

It may also be advantageous to employ carriers or dispersion agents such as active carbon, pumice stone, silica gel, alumina gel or porous sherds of burned fire clay. In some cases these said carriers may be rigidly arranged in the reaction vessel or the reaction vessel may be packed therewith and the initial materials be passed thereover together with the organic chlorine compounds and halides of sulphur.

The organic chlorine compounds are added in amounts between 0.05 and 5 per cent, preferably between 0.5 and 2.5 per cent by weight of the initial material, the halides of sulphur are added in amounts between 0.05 and 5 per cent, preferably between 0.5 and 2.5 per cent, and the above mentioned substances comprising metals are added in amounts between 0.1 and 2 per cent, preferably between 0.2 and 1 per cent.

As examples of initial materials may be mentioned brown coal, pit coal, peat, oil shales, oil sands, tars, mineral oils or fractions or extraction products of these or products obtained by the destructive hydrogenation or cracking of distillable carbonaceous materials. The catalysts are also particularly well adapted for the destructive hydrogenation of asphalts or resins or for the refining or improvement by destructive hydrogenation of liquid carbonaceous materials such as benzines, benzene, mineral oil, lubricating oils or tar fractions and also for the reduction in the content of hydrogen of hydrocarbons by destructive hydrogenation, a process known as "aromatization".

The expression "destructive hydrogenation" where herein employed is intended to comprise the most various reactions. Thus the expression includes the conversion with hydrogenating gases of carbonaceous materials, such as coal of all varieties, including lignite, other solid carbonaceous materials such as peat, shales and wood, or mineral oils, tars and the distillation, conversion and extraction products thereof. The said destructive hydrogenation may be used more particularly to produce hydrocarbons of all sorts, such as motor fuels and in particular anti-knock motor fuels, middle oils, kerosene and lubricating oils, from the aforesaid carbonaceous materials. The said expression also includes the removal of non-hydrocarbon impurities, such as sulphur- or oxygen-containing substances or nitrogen compounds by the action of hydrogen or gases containing or supplying hydrogen from crude carbonaceous materials, for example the refining by treatment with hydrogen of crude benzol, of crude motor fuels or of lubricating oils. The said expression further includes the conversion of oxygen or sulphur containing organic compounds to produce the corresponding hydrocarbons or hydrogenated hydrocarbons, for example the conversion of phenols or cresols into the corresponding cyclic hydrocarbons or hydrogenation products thereof. Finally it includes the hydrogenation of unsaturated compounds and more particularly of unsaturated hydrocarbons or of aromatic compounds and more particularly of aromatic hydrocarbons, for example, to produce hydroaromatic hydrocarbons.

The said reactions with hydrogen or hydrogen containing gases, which may be effected in the liquid or gaseous phase, are usually carried out at temperatures between 250° and 700° C. and as a rule between about 380° and 550° C. The pressures employed are usually in excess of 20 atmospheres and as a rule preferably in excess of 50 atmospheres. In some reactions, however, for example, in the refining of crude benzol rather low pressures, for example, of the order of 40 atmospheres may be employed. Generally, however, pressures of about 100, 200, 300, 500 and in some cases even 1000 atmospheres come into question.

The amount of hydrogen maintained in the reaction space and parts connected therewith, if any, varies greatly with the nature of the particular initial materials treated or according to the result in view. In general 400, 600, 1000 cubic meters or more of hydrogen, measured under normal conditions of temperature and pressure, per ton of carbonaceous material treated may be used.

It is particularly advantageous to operate by continuously introducing fresh carbonaceous material into the reaction vessel and to continuously remove products therefrom. If desired several reaction vessels may be employed in which different conditions of temperature and/or pressure, may, if necessary, be maintained and in which different catalysts may also be employed. Sufficiently converted reaction products may be removed behind any of the reaction vessels. Materials which have not been sufficiently reacted on may be recycled or treated in a further reaction vessel.

The gases for use in the reaction may consist of hydrogen alone or of mixtures containing hydrogen, for example a mixture of hydrogen with nitrogen, or water gas, or of hydrogen mixed with carbon dioxide, sulphuretted hydrogen, water vapor or methane or other hydrocarbons. Or the hydrogen may be generated in the reaction chamber by the interaction of water and coal, carbon monoxide, hydrocarbons and the like.

It has also been found to be advantageous to add to the hydrogenating gas in particular when working continuously a small amount of a hydrogen halide, for example about 0.5 to 5 per cent of hydrogen bromide or hydrogen chloride reckoned on the initial material.

The time for which the initial materials are exposed to the aforesaid hydrogenating conditions largely depends upon the nature of the particular initial material to be treated and on the result aimed at. For example if it is desired to produce benzine and middle oil from a coal paste longer periods are necessary than when starting from a tar and the operation lasts longer when converting a coal paste into benzine and middle oil than when producing chiefly gas oil and higher boiling oils. Again, a treatment in which the initial materials are only refined by hydrogenation without conversion into lower boiling hydrocarbons is usually effected within a shorter time than a treatment in which the initial materials are split up into lower boiling hydrocarbons. Furthermore the particular conditions of temperature and pressure play a decisive part for the duration of treatment, since with higher temperature the conversion proceeds more rapidly than with lower temperature; the hydrogen pressure largely influences the time required for the saturation of the treated materials. Suitable periods of operation are for example those ranging between fifteen minutes and 2 hours or more when working in the liquid phase and between half and five minutes when working in the gaseous phase but also shorter or longer periods come into consideration; in each single case the appropriate working period is to be adjusted depending on the nature of the initial material, the desired result and the particular conditions of operation to be employed.

The catalysts in accordance with the present invention are distinguished by their promoting splitting and hydrogenation in a very high degree. This latter effect becomes particularly apparent in respect of the conversion of those constituents of the initial materials of very high molecular weight. The said action of the catalyst is of particular importance when converting initial materials of high boiling point into middle oils while returning to the reaction vessel those products boiling above the upper boiling range limit of the middle oils, since when working with a catalyst according to the present invention even at high temperatures a very considerable hydrogenation besides the splitting takes place so that no condensation products poor in hydrogen occur in the portion of the products, which is continuously recycled to the reaction vessel. A further advantage attendant on the employment of said catalysts is that the products of low boiling point range obtained are not completely saturated with hydrogen. Thus when destructively hydrogenating middle oils in the gas phase according to the process of the present invention benzines having a low content of hydrogen are obtained whereas, when working up distillable carbonaceous materials of high boiling point by destructive hydrogenation in the liquid phase in the presence of the catalysts herein specified middle oils and hydrocarbons of low boiling point are obtained having a low content of hydrogen whilst the products of a higher boiling point range have a considerably higher content of hydrogen relative to carbon than the initial materials.

The catalysts in accordance with the present invention are particularly advantageous when working in the gaseous phase. In this case mainly middle oils come into question as initial materials. When working with the said catalysts it is possible to obtain in a once through operation a benzine of particularly high anti-knock value and a middle oil which has a very high content of hydrogen and which may be used directly with great advantage as a Diesel oil or illuminating oil or which may be recycled to the reaction vessel for complete conversion into benzine.

The catalyst may be added either before the introduction of the materials into the heating zone or during preheating or during the reaction. The different components of the catalyst may also be introduced into the carbonaceous materials to be treated in different parts of the apparatus.

Percentages when referred to in the present specification are by weight unless otherwise stated.

The following example will further illustrate the nature of the said invention, but it should be understood that the invention is not limited thereto.

*Example*

A crude oil boiling above 325° C. is heated up together with hydrogen in a tubular preheater while under a pressure of 250 atmospheres and then passed into a reaction vessel in which it is subjected to destructive hydrogenation at a temperature of 466° C. Before heating up 0.3 per cent of ethylene chloride are added to the oil. The hot stream of oil and hydrogen leaving the preheater has added thereto 0.5 per cent of sulphur monochloride containing 20 per cent of carbon disulphide, the whole then being conveyed into the reaction vessel. The product leaving the reaction vessel is cooled, subjected to condensation and then separated from the residual hydrogen. The liquid product contains 22 per cent of benzine, 44 per cent of middle oil and only 34 per cent of constituents boiling above 325° C. The asphalt content of the initial material was reduced to one fourth of its initial value.

What we claim is:

1. A process for the destructive hydrogenation of distillable carbonaceous material, which comprises treating said carbonaceous material at a temperature between 250° and 700° C. and under a pressure above 20 atmospheres with a gas comprising hydrogen and in the presence of an added catalyst which as its essential constituents comprises an organic chlorine compound and a halide of sulphur.

2. In the process as claimed in claim 1 employing sulphur monochloride as halide of sulphur.

MATHIAS PIER.
WALTER KROENIG.
ERNST DONATH.